US012153174B2

(12) United States Patent
Van Assche et al.

(10) Patent No.: US 12,153,174 B2
(45) Date of Patent: Nov. 26, 2024

(54) X-RAY DETECTION SYSTEM WITH IMPROVED SPATIAL COVERAGE

(71) Applicant: UNIVERSITEIT GENT, Ghent (BE)

(72) Inventors: Frederic Van Assche, De Pinte (BE); Matthieu Boone, De Pinte (BE); Sander Vanheule, Evergem (BE)

(73) Assignee: UNIVERSITEIT GENT, Ghent (BE)

( * ) Notice: Subject to any disclaimer, the term of this patent is extended or adjusted under 35 U.S.C. 154(b) by 300 days.

(21) Appl. No.: 17/624,687

(22) PCT Filed: Jul. 9, 2020

(86) PCT No.: PCT/EP2020/069372
§ 371 (c)(1),
(2) Date: Jan. 4, 2022

(87) PCT Pub. No.: WO2021/005157
PCT Pub. Date: Jan. 14, 2021

(65) Prior Publication Data
US 2022/0260734 A1    Aug. 18, 2022

(30) Foreign Application Priority Data
Jul. 9, 2019 (EP) .................................... 19185253

(51) Int. Cl.
G01T 1/24 (2006.01)
G01T 1/29 (2006.01)
G06T 7/00 (2017.01)

(52) U.S. Cl.
CPC ............ *G01T 1/243* (2013.01); *G01T 1/2985* (2013.01); *G06T 7/0012* (2013.01); *G06T 2207/10081* (2013.01); *G06T 2207/10116* (2013.01)

(58) Field of Classification Search
CPC ..... G01T 1/243; G01T 1/2985; G06T 7/0012; G06T 2207/10081; G06T 2207/10116
See application file for complete search history.

(56) References Cited

U.S. PATENT DOCUMENTS

| 2006/0203959 A1 | 9/2006 | Spartiotis et al. |
| 2009/0168966 A1 | 7/2009 | Suzuki et al. |
| 2014/0138553 A1* | 5/2014 | Ogawa ...................... G01T 1/17 250/394 |

FOREIGN PATENT DOCUMENTS

WO    WO-2020073132 A1 *    4/2020    ............. G01N 23/04

OTHER PUBLICATIONS

Masschaele et al., "UGCT: New X-Ray Radiography and Tomography Facility," Nuclear Instruments and Methods in Physics Research A, vol. 580, May 23, 2007, pp. 266-269.
(Continued)

*Primary Examiner* — David P Porta
*Assistant Examiner* — Fani Polyzos Boosalis
(74) *Attorney, Agent, or Firm* — Workman Nydegger

(57) ABSTRACT

An X-ray detection system is described having a solid-state detector module including a plurality of detector tiles at a first side thereof for directly detecting X-ray radiation. The detector module has a plurality of interstitial areas separating adjacent tiles of the detector module, and at least one actuator for inducing motion of the detector module to a plurality of detection positions along a trajectory with respect to a stationary reference frame while the detector module is operated in an exposure mode. The spatial extent of the trajectory in the stationary reference frame is at least as large as the largest interstitial area, and the detector module is adapted for acquiring a plurality of frames in the exposure mode at a frame acquisition rate at least a factor of 100 faster than the inverse of a predetermined exposure time for the exposure mode.

17 Claims, 9 Drawing Sheets

(56) References Cited

OTHER PUBLICATIONS

Shastry et al., "In-Situ High Resolution Dynamic X-Ray Microtomographic Imaging of Olive Oil Removal in Kitchen Sponges by Squeezing and Rinsing," Materials, vol. 11, Issue 1482, Aug. 20, 2018, pp. 1-15.
Extended European Search Report and Written Opinion from corresponding Application No. 19185253.2, Nov. 26, 2019.
International Search Report and Written Opinion from PCT Application No. PCT/EP2020/069372, Sep. 7, 2020.

\* cited by examiner

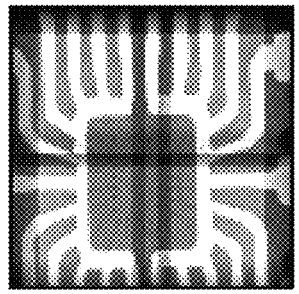 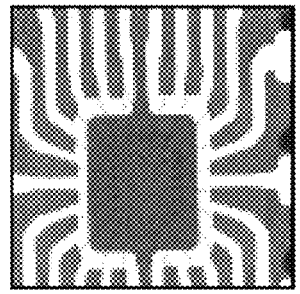 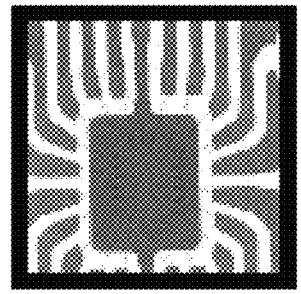
Fig. 7(a)  Fig. 7(b)  Fig. 7(c)
FIG. 7
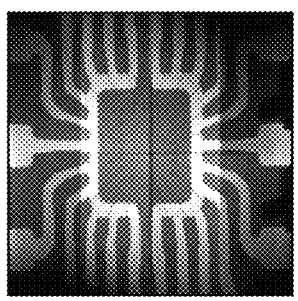 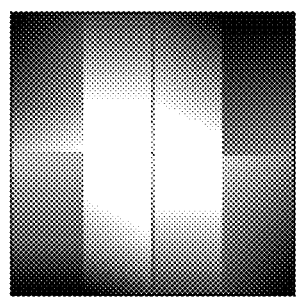 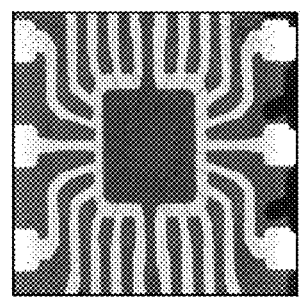
Fig. 8(a)  Fig. 8(b)  Fig. 8(c)
FIG. 8
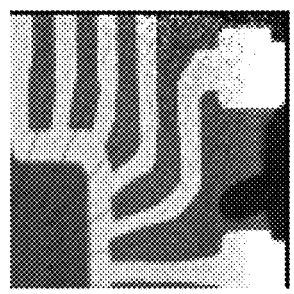 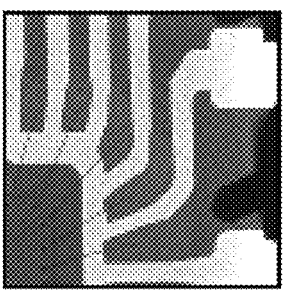 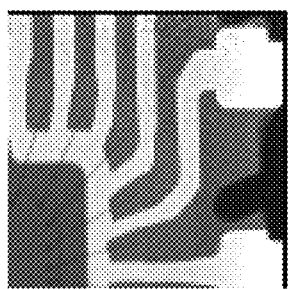
Fig. 9(a)  Fig. 9(b)  Fig. 9(c)
FIG. 9

X-RAY DETECTION SYSTEM WITH IMPROVED SPATIAL COVERAGE

FIELD OF THE INVENTION

The present invention relates to the field of X-ray detection methods and systems. In particular, it relates to X-ray detection methods and systems which improve the spatial coverage of the system by reducing the amount of missing image data and/or by extending the field of view of the detector.

BACKGROUND OF THE INVENTION

X-ray detection is widely used in a variety of applications, such as in medical imaging and in material characterization. Depending on the application, large field of view and high resolution are highly relevant requirements. In order to obtain a large field of view or a high pixel count, multi-sensor systems can be used. In multi-sensor detectors, due to the low pixel count of typical direct conversion X-ray sensors, the frames obtained with the different sensors are often stitched to create large-area detectors and increased pixel counts. The gaps that are created between the different frames nevertheless are an issue to solve. These gaps can result from missing pixels as well as from different pixel dimensions in this interstitial area.

Currently, when mitigation is performed, this typically is achieved by software solutions, such as for example by performing interpolation. While this solves the visual disturbance, this does not provide a solution when specific features are present in the regions where the different frames need to be matched with each other.

Sometimes also hardware-level solutions are provided, whereby the gaps are mitigated by overlapping sensors, sometimes also referred to as roofing tiles. Nevertheless, typically geometrical effects and edge effects still arise due to the overlap.

Furthermore, there is the urge for increasing the image resolution. The pixel size of direct detection X-ray detectors typically is large.

Overall, there is a need for good methods and systems for X-ray detection with high spatial coverage.

SUMMARY OF THE INVENTION

It is an object of embodiments of the present invention to provide good methods and systems for X-ray detection with good, e.g. improved, spatial coverage.

It is an advantage of embodiments of the present invention that the system allows for real-time integration of detector movement information into the acquisition data and processing stream of an X-ray detection recording thus allowing for improving spatial coverage of the X-ray detection system.

It is an advantage of embodiments of the present invention that imaging can be performed by applying a single shot detection with minimal motion blur due to the high frames per second that can be recorded, balanced with the acquisition times, for direct conversion, spectral or hyperspectral photon counting systems.

The above objective is accomplished by a method and device according to the present invention.

The present invention relates to an X-ray detection system comprising a solid-state detector module comprising a plurality of detector tiles at a first side thereof for directly detecting X-ray radiation, said detector module further comprising a plurality of interstitial areas separating adjacent tiles of the detector module, and at least one actuator for inducing motion to the detector module to a plurality of detection positions along a trajectory with respect to a stationary reference frame while the detector module is operated in an exposure mode, wherein the spatial extent of the trajectory in the stationary reference frame during the exposure mode is at least as large as the smallest dimension of the largest interstitial area, and wherein the detector module is adapted for acquiring a plurality of frames in the exposure mode at a frame acquisition rate at least a factor of 100, e.g. at least a factor of 1000, faster than the inverse of a predetermined exposure time for the exposure mode.

The trajectory may provide a movement of the detector module with reference to a stationary source.

The induced movement of the detector may occur at least in a direction parallel to a smallest dimension of the interstitial area between adjacent tiles, i.e. in a direction parallel to a smallest dimension of the gap, e.g. the largest gap, between adjacent tiles.

The X-ray detection system also may comprise a repositionable carrier structure adapted for receiving and securing the detector module. The repositionable carrier structure thus may indirectly couple the detector module to the actuator. Therefore, the actuator may directly or indirectly drive the detector module. The repositionable carrier structure may be adapted for being translated in two or more directions and/or for being rotated.

The at least one actuator may comprise at least one of a motorized linear actuator, a piezoelectric actuator, a magnetostrictive actuator.

The stationary reference frame may be defined with respect to an external source of X-ray radiation or an object to be imaged.

The X-ray detection system may further comprise a processing unit adapted for determining the plurality of detection positions along the trajectory, based on at least a predetermined total field of view for detection and on a predetermined virtual sampling grid comprising a plurality of sampling points defined in the stationary reference frame, the processing unit being operatively coupled to the at least one actuator to control the induced motion of the detector module by the at least one actuator via a sequence of drive signals generated in accordance to the plurality of detection positions along the trajectory.

The processing unit may be further adapted for determining an effective exposure time for the sampling points of the virtual sampling grid based on the determined trajectory. Where in embodiments of the present invention reference is made to an exposure map, reference may be made to a representation of an effective exposure time for the sampling points of the virtual sampling grid based on the determined trajectory.

In case of e.g. non-homogeneous illumination, the effective exposure time may be determined and may be a tool for determining the trajectory since the effective exposure time may express a degree of homogenization of the illumination.

The X-ray detection system may further comprise position feedback means, such as non-contact optical or magnetic linear encoders or inertial guidance system comprising motion sensors, for gathering position feedback information relative to a current detection position of the detector module when driven.

The processing unit may be operatively coupled to the position feedback means to receive the gathered feedback information, and the processing unit further being adapted for determining the current detection position of the detector module based on the received feedback information.

The processing unit may be further adapted for adjusting the trajectory based on the determined current detection position of the detector module.

The processing unit may be operatively coupled to the detector module to receive the plurality of frames acquired in exposure mode.

The processing unit may be adapted for identifying charge clusters in each of the received acquired frames and for determining a point of origin and a total charge for each identified charge cluster, wherein each charge cluster is indicative of a detection event and is extending over a collection of neighbouring pixel elements of the detector module.

The processing unit may be further adapted for assigning a corresponding sampling point of the virtual sampling grid to each point of origin and for combining the plurality of frames into at least one output image having a selectable pixel grid size, wherein combining into the at least one output image comprises applying detected event selection rules, such as X-ray photon coincidence removal or X-ray photon energy thresholding, to the individual sampling points before resampling the virtual sampling grid at the selected resolution to generate the at least one output image.

The present invention also relates to a method for reducing an amount of missing or defective output image data in a solid-state X-ray detection module, the detection module comprising a plurality of detector tiles for directly detecting X-ray radiation, said detector module further comprising a plurality of interstitial areas separating adjacent tiles of the detector module, the method comprising:

based on a predetermined field of view for detection and on a predetermined virtual sampling grid comprising a plurality of sampling points defined in a stationary reference frame, determining a trajectory for the detector module and a plurality of detection positions along the trajectory, moving the detector module with the secured detector module in the stationary reference frame in accordance with the determined trajectory, wherein a travel range of the determined trajectory in the stationary reference frame is at least as large as the largest interstitial area, acquiring, during an exposure time for the detector module and whilst moving along the determined trajectory, a plurality of frames at a frame acquisition rate at least a factor of 100, e.g. at least a factor of 1000, faster than the inverse of said exposure time, and combining the plurality of acquired frames into at least one output image comprising output image data in output image regions associated with the interstitial areas.

The method may also comprise securing the detector module directly to an actuator or to a repositionable carrier structure which is driven by the actuator. The method may further comprise steps of:

in each frame acquired by the moving detector module, identifying charge clusters, determining a point of origin and a total charge for each identified charge cluster, assigning a sampling point of the virtual sampling grid to each point of origin, applying detection event selection rules, such as X-ray photon coincidence removal or X-ray photon energy thresholding, to the individual sampling points of the virtual sampling grid, and resampling the virtual sampling grid at a selectable resolution to generate the at least one output image.

The method may further comprise the steps of:

gathering position feedback information relative to a current detection position of the detector module when moved, determining the current detection position of the detector module based on the gathered position feedback information, adjusting a coordinate in the stationary reference system for sampling points of the virtual sampling grid based on the determined current detection position of the detector module, optionally, adjusting the trajectory or at least a fraction of the plurality of detection positions along the trajectory based on the determined current detection position of the detector module, based on the trajectory or adjusted trajectory, determining an effective exposure time for each sampling point of the virtual sampling grid.

The detector module may be moved in a plane oriented at 90+/−30 arc degrees with respect to a beam axis of an X-ray beam incident on the detection module and/or the detection module may be moved by applying a sequence of drive signals in accordance with the determined trajectory to at least one actuator coupled to the detector module.

In case of non-parallel beams, the beam axis may be defined as the line perpendicular to the detector plane crossing the centre of the source.

The present invention also relates to a method for reducing defective output image data in a solid-state X-ray detection module, the method comprising moving the detector module in a stationary reference frame in accordance with a determined trajectory, wherein a travel range of the determined trajectory in the stationary reference frame is larger than the inter pixel distance, acquiring, during an exposure time for the detector module and whilst moving along the determined trajectory, a plurality of frames at a frame acquisition rate at least a factor of 100 faster than the inverse of said exposure time and combining the plurality of acquired frames into at least one output image comprising output image data in output image regions associated with defective pixels.

The present invention also relates to a controller for performing any of the methods as described above.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which:

FIG. 2c represents the exposure map used to obtain FIG. 2d from FIG. 2b. The images are acquired with a single-sensor detector in which a gap being 1000 µm, i.e. exactly 4 empty pixels, has been inserted.

FIG. 3c represents the exposure map used to obtain FIG. 3d from FIG. 3b. FIG. 3e and FIG. 3f represent FIG. 3a and FIG. 3b, respectively, after open-beam normalization. The images are acquired with the assumption of the gap being 500 µm, i.e. exactly 2 empty pixels have been inserted.

FIG. 7, including FIGS. 7a to 7c, shows an assessment of the method using a single module HEXITEC with artificially induced gaps with a width of 2 pixels. The gaps are still clearly visible in the raw integrated data 7(a), but are normalized by the exposure frame in the after exposure correction 7(b). For comparison, 7(c) shows the same object without detector motion in an example illustrating features of an embodiment of the present invention.

FIG. 8, including FIGS. 8a to 8c, illustrates the extending of the field-of-view of a single module HEXITEC by a factor 2 using continuous motion of the sensor, for the raw integrated data 8(a), the exposure frame 8(b) and the correction 8(c) in an example illustrating features of an embodiment of the present invention.

FIG. 9, including FIGS. 9a to 9c, illustrates details of the radiograph of FIG. 8, compared with a static image 9(a) of the same region at the same total exposure time. In the illustration with extended exposure 9(c), a detail of the radiograph using the extended FOV is shown, matching the average exposure time per pixel from subfigure 9(b).

Figure 1A:
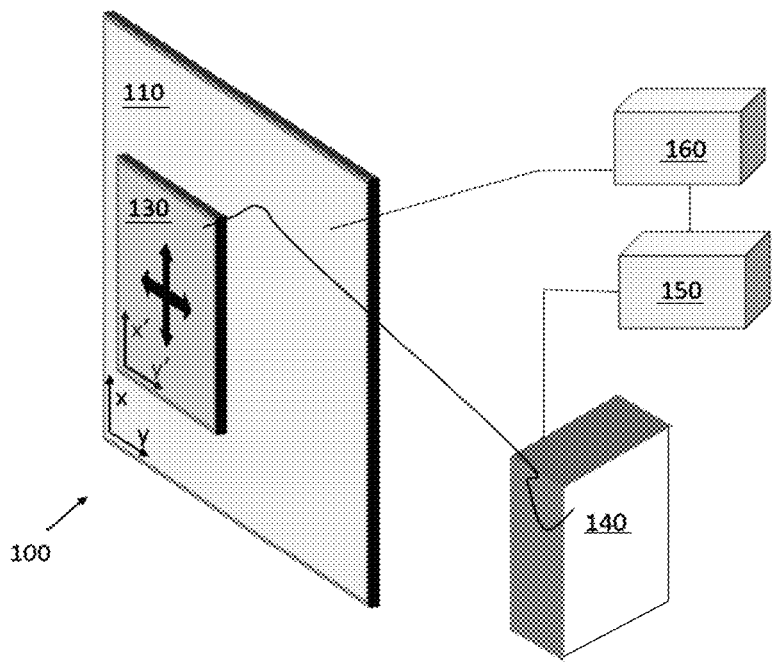
FIG. 1a and FIG. 1b illustrates a schematic overview of a system according to an embodiment of the present invention.

In the drawings, the size of some of the elements may be exaggerated and not drawn on scale for illustrative purposes. The dimensions and the relative dimensions do not necessarily correspond to actual reductions to practice of the invention. Any reference signs in the claims shall not be construed as limiting the scope.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Whereas in the present description and claims reference is made to areas, these may typically be planar areas, although embodiments are not limited thereto and also curved areas may be used.

Whereas in the present invention reference is made to a trajectory, reference is made to the path created by an at least one-dimensional movement. The movement may be one dimensional, two dimensional or three dimensional.

Whereas in the present invention reference is made to the spatial extent of the trajectory in the stationary reference frame, reference is made to the maximal linear distance occurring in the projection of the trajectory on the stationary reference frame. In some embodiments, e.g. where a solution is sought for a missing area in between two sensors, the trajectory may be a simple translation along the shortest dimension of the gap between the two sensors. Nevertheless, the trajectory also may be more complex.

Where in embodiments of the present invention reference is made to a tile, reference typically is made to an array of pixels, each tile thus corresponding with a×b pixels. Typically, a and b are larger than 1, e.g. larger than 5, e.g. larger than 10.

In one aspect, the present invention relates to an X-ray detection system with improved spatial coverage. Such an X-ray detection system may be any type of X-ray detection system such as for example—but not limited to—photon counting detectors or integrating detectors. Some particular examples may be HEXITEC detectors as available from Quantum Detectors, Medipix/Timepix detectors, or detectors as available from Dectris, etc. The X-ray detection system may be detectors allowing fast frame accumulation. In some examples, the X-ray detection systems may be hyperspectral detection systems.

In some embodiments, the X-ray detector system may be tile-based using the "frame summing" principle for obtaining a final image. In such systems typically, each frame may be processed separately to retrieve single photons. The single photon events are summed for all frames in a single exposure, obtaining the final image. Nevertheless, the method can also be used in a charge integration mode, e.g. when the dynamic range in a single frame is not sufficient, for example due to the high precision readout, and frames need to be summed.

The system comprises a solid-state detector module comprising a plurality of detector tiles for directly detecting X-ray radiation. Examples of possible detector modules are hybrid detectors with a sensor slab bonded to a readout ASIC. Nevertheless, nor the material choice nor the bonding method are limiting since these do not significantly affect the frame rate nor negate really the need for tiled systems. Some examples of materials that may be used are semiconductor materials such as Si, CdTe, CZT or GaAs.

The detector module further comprises a plurality of interstitial areas separating adjacent tiles of the detector module.

The interstitial areas may be zones where there is a gap between two detecting regions but alternatively these may also be zones with a highly disturbed pixel response. In some embodiments these are thus non-detecting areas wherein no pixels are present but in other embodiments these may for example be areas with pixels having different pixel size compared to other regions in the detector. The type of interstitial areas may depend on the way the sensor is constructed.

Where in embodiments reference is made to tiles, reference typically is made to regions where there is a uniform pixel distribution and density. Detector tiles may be separate detector units, e.g. detector chips, which are combined together as one detector module and whereby gaps or interstitial areas are present between adjacent detector units or tiles. Detector tiles may be detector regions present on one detector unit, i.e. on one detector chip, and whereby an area of defective pixels is present between adjacent detector regions, the area of defective pixels forming the interstitial area or gap. A detector tile typically may be construed of a detection layer and a readout layer. Interstitial areas occur where either the detection layer or the readout layer show a non-continuity with respect to pixel density. It is to be noted that the function of the detection layer and the readout layer also can be combined in a single layer or layer structure. Where reference is made to pixel density for the detection layer, reference is made to the pixel density caused by the pixel grid of the readout layer that is transferred to the detection layer due to the electrical fields.

The system also may comprise a repositionable carrier structure adapted for receiving and securing the detector module. The detector module may be secured at a second side opposite to the first side, whereby the first side is the side where the detecting pixels are present, although embodiments are not limited thereto and for example securing from an edge side or even from the first side may be performed. Securing may be performed in any suitable way, such as for example by screwing, using adhesive tape, by gluing, by clamping, by clicking, using snap mechanisms, etc. In one example, the detector module is screwed to a baseplate. It is to be noted that where reference is made to the detector module being secured to a repositionable carrier structure, this does not need to include the peripheral electronics. For example, in one embodiment, an ASIC and sensor without peripheral electronics may be mounted on a translation stage, whereby the peripheral electronics may be positioned away from the repositionable carrier structure. As indicated above, the system may not comprise an explicit repositionable carrier structure, but the detector module may alternatively be directly mounted to the actuator.

The system further comprises at least one actuator for inducing motion to detector module to a plurality of detection positions along a trajectory with respect to a stationary reference frame while the detector module is operated in an exposure mode. The actuator may be an active actuator for actively inducing controlled motion by driving the detector module. Nevertheless, this may also be a passive actuator, e.g. by mounting the detector module in a set of springs which also can induce the motion.

The trajectory may be a predetermined trajectory. In some embodiments, the trajectory may be a combination of linear portions, such that the movement can be performed along a single axis at a time, although embodiments are not limited thereto. Some particular exemplary trajectories may be square, or rectangular shaped. In some embodiments, the trajectory is a closed trajectory, which is repeated over time, although embodiments are not limited thereto. The trajectory also may be or may comprise a movement about a rotation axis perpendicular to the detector. In other words, the movement may comprise a rotation or may be a rotation.

In some embodiments, the trajectory also may be not predetermined, and the direction of movement could be determined for example at random or may be selected real-time, e.g. based on feedback from the actual detected frames, when these are captured. For example, in some embodiments, movement may be slower in regions where fewer photons per second are captured with reference to a certain threshold, e.g. user set threshold, and faster in regions where more photons per second are captured. More generally, the trajectory along which the movement occurs may be selected as function of the detected images, in order to improve imaging or guarantee a predetermined image quality. Such trajectory selection may for example be based on an algorithm, a neural network or predefined rules. In other words, the movement may be dynamically adapted, taking into account the image quality to be obtained.

According to advantageous embodiments of the present invention the movement of the detector occurs at least also in a direction parallel to the smallest dimension of an interstitial area, e.g. gap, for example a smallest dimension of the largest interstitial area.

The spatial extent of the trajectory in the stationary reference frame is at least as large as the smallest dimension of the largest interstitial area, which may also be referred to as the largest interstitial distance, and wherein the detector module is adapted for acquiring a plurality of frames in the exposure mode at a frame acquisition rate at least a factor of 100, e.g. at least a factor of 1000, faster than the inverse of a predetermined exposure time for the exposure mode. In some embodiments, the spatial extent may be 50 µm or larger.

The spatial extent may typically depend on the size of the interstitial areas. At the very least one wants to be able to move enough to completely cover the interstitial areas with some overlap, so translations on the order of a few times the detector pixel pitch may define a lower border. On the upper end, the extent may be as large as the sensor. On the upper end one may be limited by the exposure time—frame rate factor, which means that for slower systems under consideration one wouldn't use travel ranges much larger than a single digit times the detector width/height, or one would need excessively long exposure times to cover the whole extended area without motion blur. The exposure time may for example be at least a second or larger. The exposure time may in some embodiments range between 1000 frames and 1E9 (a thousand million) frames.

The actuator is an example of a mechanism to physically move the detector module and the acquisition process according to embodiments of the present invention thus is adapted for, during the physical movement of the detector module, capturing images, so that overall images with large overlap and minimal dead zones can be derived. The actuator may provide a mechanism that is accurate and fast.

The system may comprise a processing unit. The processing unit may be adapted for controlling the motion induced by the actuator. The processing unit may be any type of processing unit. It may be referred to as processor. The processing unit may in some embodiments be adapted for determining the trajectory to be followed and for controlling the actuator so as to induce movement along the trajectory. In some embodiments, the processor may be adapted for determining a plurality of detection positions along the trajectory based at least on a predetermined total field of view for detection and on a predetermined virtual sampling grid comprising a plurality of sampling points defined in the stationary reference frame. The processing unit may be operatively coupled to the at least one actuator for controlling the induced motion of the detector module. The latter may be performed using a sequence of drive signals. Such drive signals may be generated in accordance to the plurality of detection positions along the trajectory.

In some embodiments, the processing unit is further adapted for determining an effective exposure time for sampling points of the virtual sampling grid based on the determined trajectory.

The processing unit may in some embodiments be further adapted for adjusting the trajectory, based on the determined current detection position of the detector module.

In some embodiments, the processing unit may be operatively coupled to the detector module to receive the plurality of frames acquired in exposure mode and is also adapted for identifying charge clusters in each of the received acquired frames and for determining a point of origin and a total charge for each identified charge cluster, wherein each charge cluster is indicative of a detection event and is extending over a collection of neighbouring pixel elements of the detector module.

Further functionality of the processing unit may be controlling of the different features of the system elements that are discussed above.

In embodiments of the present invention, the processing unit may be adapted for acquisition of data performant enough for real-time transferring and processing of camera generated frames. The acquisition software chain may be implemented on the processing unit. This typically may be performed at high frame rate. The acquisition times typically are several orders slower than the camera frame rate. This helps to limit or prevent any motion blur by minimizing detector movement during one single hardware frame.

In some embodiments, the processing unit may be further adapted for assigning a corresponding sampling point of the virtual sampling grid to each point of origin and for combining the plurality of frames into at least one output image having a selectable pixel grid size. Such combining may include applying detection event selection rules, such as X-ray photon coincidence removal or X-ray photon energy thresholding, to the individual sampling points before resampling the virtual sampling grid at the selected resolution.

In some embodiments, the system also comprises a position feedback means, such as non-contact optical or magnetic linear encoders or inertial guidance system comprising motion sensors, for gathering position feedback information relative to a current detection position of the detector module when driven. Such a position feedback means may be adapted for performing accurate position encoding, since the latter is to be used for tagging the individual frames with the camera positions at the time of recording. The position feedback means also may be adapted for correlating the position with the virtual sampling grid, or the fixed reference frame.

In some embodiments, the processing unit also may be operatively coupled to the position feedback means to receive the gathered feedback information, and the processing unit further being adapted for determining the current detection position of the detector module based on the received feedback information.

Figure 1B:
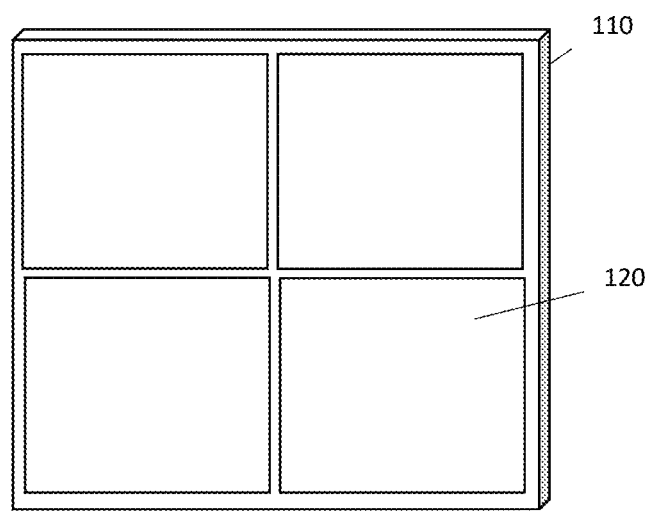

By way of illustration, an X-ray detection system 100 comprising a detector module 110 with tiles 120 is shown in FIG. 1*a* and FIG. 1*b*. The detector module 110 is in the present illustration mounted on a carrier system 130 that is moveable as whole by actuator 140. In the exemplary system, also the processing unit 150 for controlling the process, e.g. the movement, and the feedback means 160 is shown.

In one aspect, the present invention also relates to a method for obtaining an improved spatial coverage, e.g. by reducing an amount of missing or defective output image data, in a solid-state X-ray detection module. The method may be especially suitable for being performed with a system as described in the first aspect, although embodiments are not limited thereto. The method may be especially applicable to a detection module comprising a plurality of detector tiles for directly detecting X-ray radiation, said detector module further comprising a plurality of interstitial areas separating adjacent tiles of the detector module. According to embodiments of the present invention, the method comprises determining a trajectory for the detection module and a plurality of detection positions along the trajectory, based on a predetermined field of view for detection and on a predetermined virtual sampling grid comprising a plurality of sampling points defined in a stationary reference frame or alternatively it may comprise obtaining such a trajectory. The method further comprises moving the detector module in the stationary reference frame in accordance with the determined trajectory, wherein a travel range of the determined trajectory in the stationary reference frame is at least as large as the largest interstitial area. It also comprises acquiring, during an exposure time for the detector module and whilst moving along the determined trajectory, a plurality of frames at a frame acquisition rate at least a factor of 100, e.g. at least a factor of 1000, faster than the inverse of said exposure time, and combining the plurality of acquired frames into at least one output image comprising output image data in output image regions associated with the interstitial areas. Further method steps may express the functionality of one or more elements or features of the system as described in the first aspect.

In yet another embodiment, the method of the above aspect is used for eliminating defective pixels in a single detection chip. The method therefore is not necessarily limited to use with tiled detectors, i.e. detectors comprising multiple detection units or chips, but can also be applied to a single detection area or region whereby an area of defective pixels (a gap) is present between adjacent non-defective areas. Such a method allows for making larger detection areas with fewer penalties. The present invention thus relates to a method for reducing defective output image data in a solid-state X-ray detection module, hence improves the spatial coverage of the X-ray detector. The method comprises moving the detector module in a stationary reference frame in accordance with a determined trajectory, wherein a travel range of the determined trajectory in the stationary reference frame is larger than the smallest dimension of the interstitial defective area (i.e. the area formed by a plurality of adjacent defective pixels) between adjacent non-defective areas (i.e. areas formed by a plurality of adjacent non-defective pixels), e.g. the smallest dimension of the largest defective area minus the largest distance between the centre points of two neighbouring pixels, acquiring, during an exposure time for the detector module and whilst moving along the determined trajectory, a plurality of frames at a frame acquisition rate at least a factor of 100 faster than the inverse of said exposure time and combining the plurality of acquired frames into a single output image comprising output image data in output image regions associated with defective pixels. Other features and advantages may be, mutates mutandis, as set out in the earlier aspects of the present invention. In some embodiments, the travel range is of the same order of magnitude as the biggest defect that needs to be solved. Defective pixels thereby can occur in clusters, which is typically the case in the envisaged detectors, yet it is possible that the maximum cluster size is only 1 by 1 pixel.

In still another aspect, the above-described system embodiments may correspond with an implementation of the methods as described above, as a computer implemented invention in a processor. Such a system or processor—the processor also being discussed in functionality in an aspect described above—includes at least one programmable computing component coupled to a memory subsystem that includes at least one form of memory, e.g., RAM, ROM, and so forth. It is to be noted that the computing component or computing components may be a general purpose, or a special purpose computing component, and may be for inclusion in a device, e.g., a chip that has other components that perform other functions. Thus, one or more aspects of the present invention can be implemented in digital electronic circuitry, or in computer hardware, firmware, software, or in combinations of them. While a processor as such is prior art, a system or processor that includes the instructions to implement aspects of the methods is not prior art. The present invention thus also includes a computer program product which provides the functionality of any or part of the system as described in the first aspect. Similarly, the present invention relates to a controller or processor for performing the method aspects of the present invention, or for assisting therein, when such a processor or controller is coupled to a detection system, e.g. a detection system as described in the first aspect.

In yet another aspect, the present invention relates to a data carrier, e.g. a non-transitory data carrier, for carrying such a computer program product. Such a data carrier may comprise a computer program product tangibly embodied thereon and may carry machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

By way of illustration, embodiments of the present invention not being limited thereto, experimental results using an exemplary embodiment of the present invention are shown, illustrating possibilities and advantages. The experimental results illustrate advantages in two application domains. In the example, the images are acquired using either a single-module HEXITEC hyperspectral photon-counting X-ray detector or a 2×2 assembly of HEXITEC hyperspectral photon-counting X-ray detectors mounted on the Medusa scanner at Ghent University. The Medusa scanner is a custom-designed micro-CT system based on and re-using the essential components of the system as described in "UGCT: New X-ray radiography and tomography facility" by Masschaele et al. in Nuclear Instruments and Methods in Physical Research Section A: Accelerators, Spectrometers, Detectors and Associated Equipment, Vol. 580 (1), (2007), pp 266-269. The X-ray source is a Feinfocus FXT-160.51 transmission tube with a W target operated at 50 kVp and 150 µA target current. For highly attenuating objects, the beam was filtered using 2 mm Cu in order to reduce the global attenuation of the object hence to have a smaller difference in count rate between the attenuated and the unattenuated beam, thus reducing the pulse pileup effects. Note that due to the usage of a hyperspectral camera, beam hardening is not an issue and is therefore no reason to apply beam filtration. The camera control, readout and cluster processing are handled by in-house developed software. The software allows for accurate calibration of the detectors, which has been performed prior to the experiments using both radioactive sources ($^{241}$Am and $^{57}$Co) and the characteristic radiation of an X-ray source spectrum (W L-lines). The sample is mounted on motorized linear stages to adjust the height of the sample and the geometrical magnification. The detectors were moved in a 2-dimensional plane perpendicular to the main X-ray beam axis. The translation stage used is a two-axis translation stage as available from OWIS GmbH. By way of illustration, a microchip package was imaged using the single-module HEXITEC X-ray detector, with which inter-tile gaps and defective pixels can be emulated by not reading out part of the sensor. The detector readout frame rate was 9.1 kHz. The detector physical frame size was 80 by 80 pixels, whereby in practice 78 by 78 pixels were used since the outer pixels at the border were not used. The detector physical pixel pitch was 250 µm and the detector physical size was 20 mm by 20 mm.

Figure 2A:
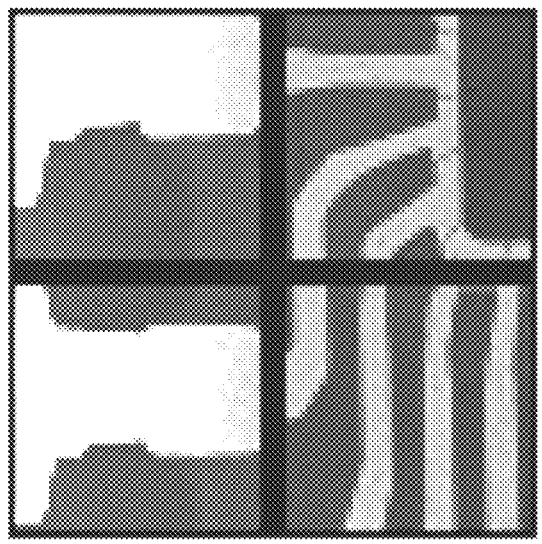
FIGS. 2a to 2d illustrate comparative experiments using a system according to an embodiment of the present invention for mitigation of inter-tile gaps without (FIG. 2a) and with (FIG. 2b and FIG. 2d) detector motion.
Figure 2B:
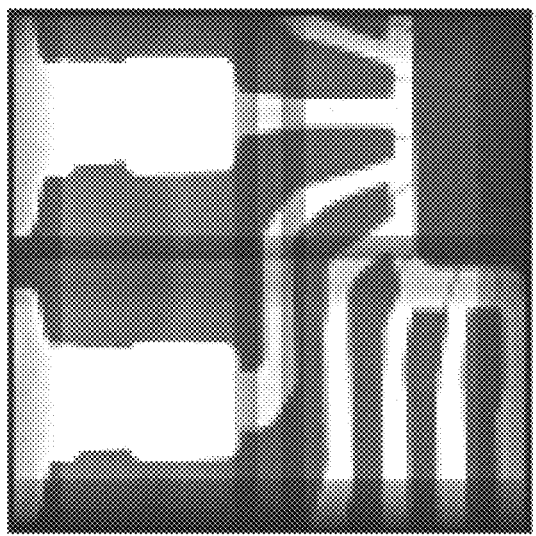
Figure 2C:
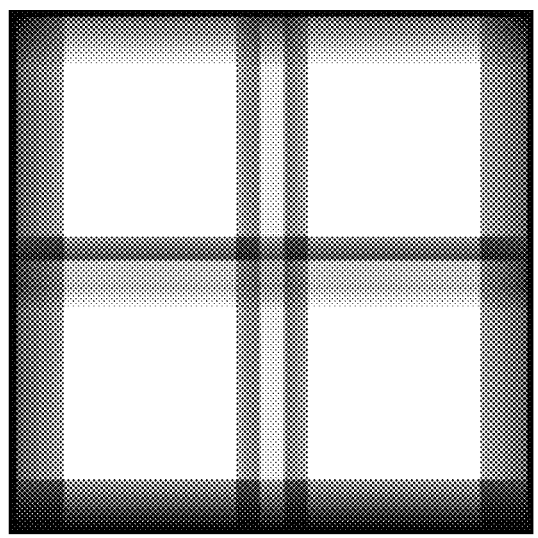
Figure 2D:
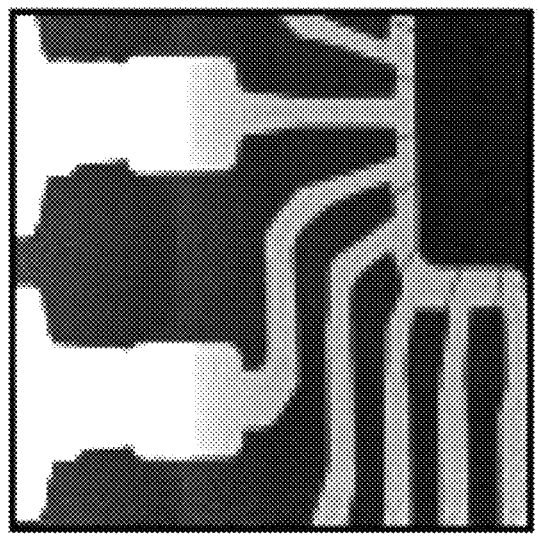

In a first example, mitigation of inter-tile gaps for multi-sensor X-ray detectors is shown (FIG. 2a to FIG. 2d), where a multi-sensor system was simulated by masking two lines across the sensor output using acquisition software. Using conventional static acquisition, the image as shown in FIG. 2a was produced clearly showing the missing information where inter-tile gaps are simulated. The principle according to embodiments of the present invention was then enabled by moving the detector over a 2 mm by 2 mm U-shaped path, assigning each physical frame to its correctly offset position in the slightly larger image in the virtual sampling grid. In parallel, a virtual exposure frame was kept, counting the number of physical frames used to fill each pixel in the virtual sampling grid. These images are shown in FIG. 2b, illustrating the direct output when applying a method according to an embodiment of the present invention, and FIG. 2c, illustrating an exposure map of the acquisition. By using the virtual exposure frame to normalise the unevenly exposed image in the virtual sampling grid, the corrected frame as shown in FIG. 2d is obtained. In this example, the exposure time was 30 s and the simulated tile size was 37 by 37 pixels, i.e. four tiles were simulated. The gap size was 4 pixels, corresponding with a 1 mm gap at a 250 µm pixel pitch. The movement trajectory was 2 mm by 2 mm and a U-shaped path. The effective virtual frame size was 88 by 88 pixels of 250 by 250 micrometre.

Figure 3A:
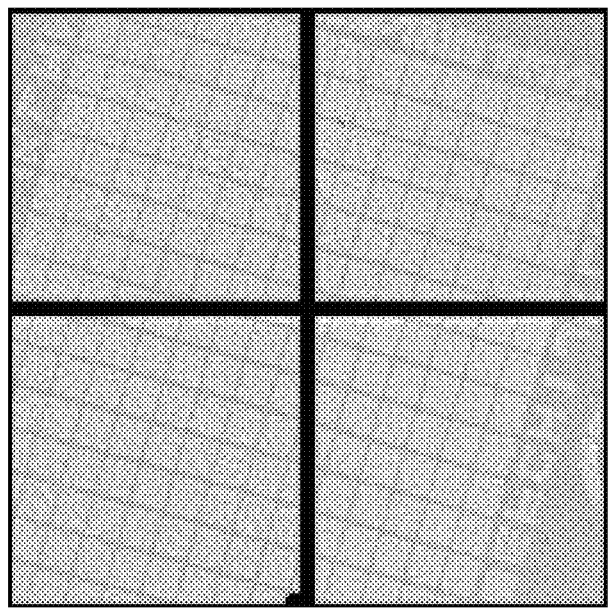
FIG. 3a to FIG. 3f illustrate a comparison between a radiographic image of a TEM sample grid according to an embodiment of the present invention for multi-sensor X-ray detectors, without (FIG. 3a) and with (FIG. 3b and FIG. 3d) detector motion.
Figure 3B:
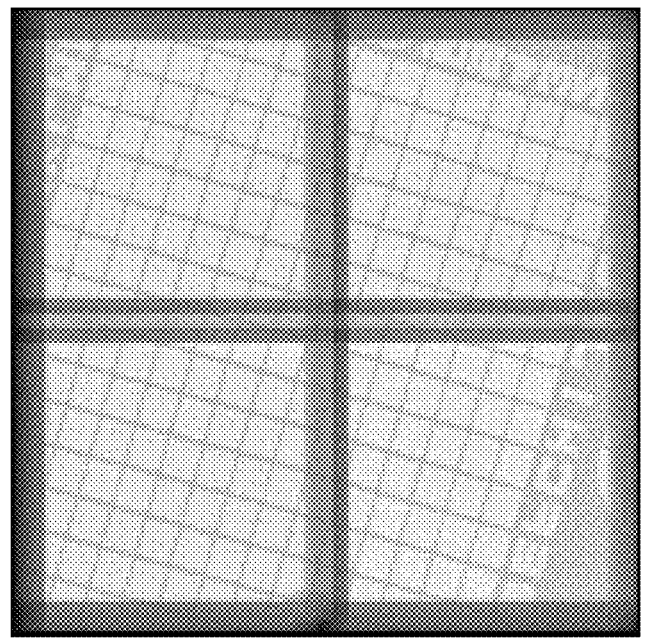
Figure 3C:
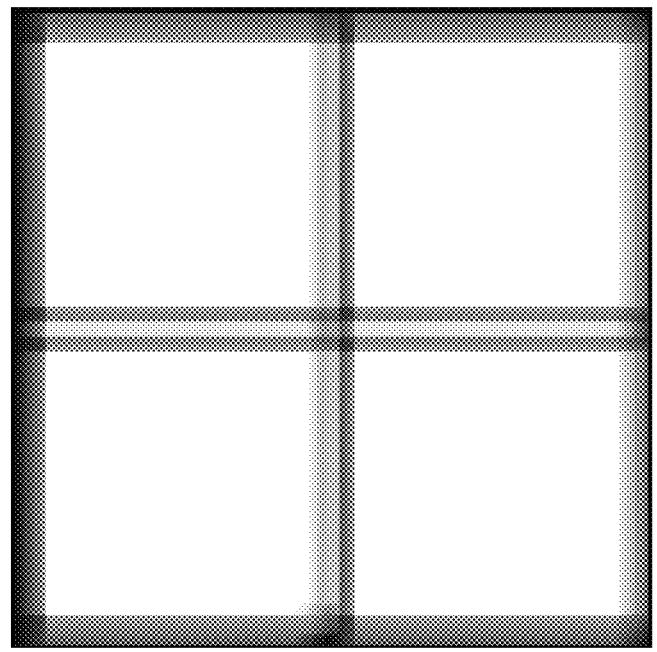
Figure 3D:
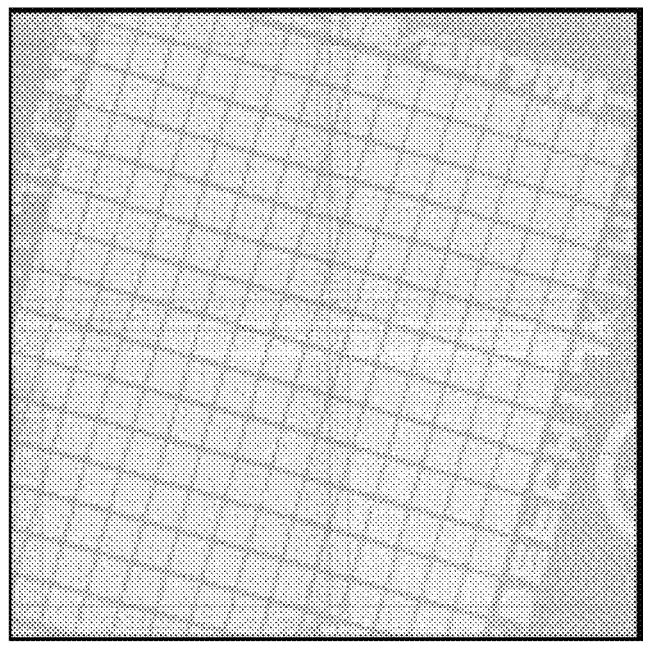
Figure 3E:
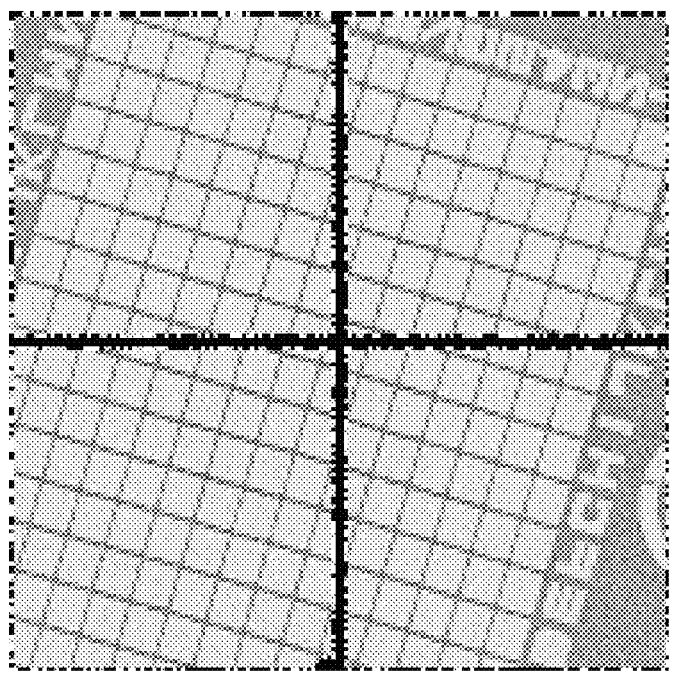
Figure 3F:
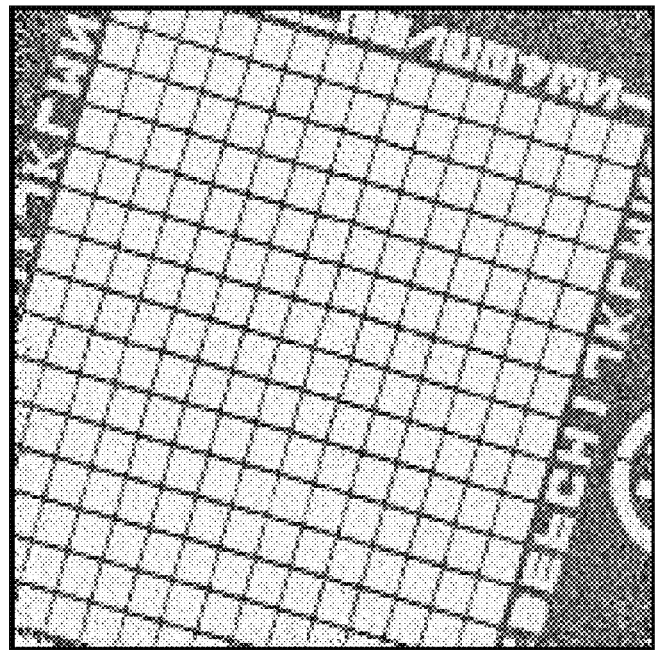

In a second example, mitigation of inter-tile gaps for multi-sensor X-ray detectors is shown (FIG. 3a to FIG. 3f), where an assembly of 2 by 2 HEXITEC ASICS bump bonded to a 1 mm CdTe sensor is used. The smallest dimension of the inter-tile gap is estimated to be approximately 500 µm, and acquisitions are recorded using an inter-tile gap size of exactly 2 pixels of 250 µm by 250 µm. The raw frames are read out at a rate of 6.3 kHz. The principle according to embodiments of the present invention was then enabled by moving the detector over a 2 mm by 2 mm U-shaped path, assigning each physical frame to its correctly offset position in the slightly larger image in the virtual sampling grid. In parallel, a virtual exposure frame was kept, counting the number of physical frames used to fill each pixel in the virtual sampling grid. These images are shown in FIG. 3b, illustrating the direct output when applying a method according to an embodiment of the present invention, and FIG. 3c, illustrating an exposure map of the acquisition. By using the virtual exposure frame to normalise the unevenly exposed image in the virtual sampling grid, the corrected frame as shown in FIG. 3d is obtained. Further correction for the remaining artefacts visible in FIG. 3d, caused by the pixels located at the border of each tile, is provided by open-beam normalization, resulting in FIG. 3f. For comparison, the open-beam normalized image obtained without application of the motion (i.e. obtained from FIG. 3a) is shown in FIG. 3e. In this example, the exposure time was 30 s and the simulated tile size was 80 by 80 pixels. The movement trajectory was 2 mm by 2 mm and a U-shaped path. The effective virtual frame size was 170 by 170 pixels of 250 by 250 micrometre.

Figure 4A:
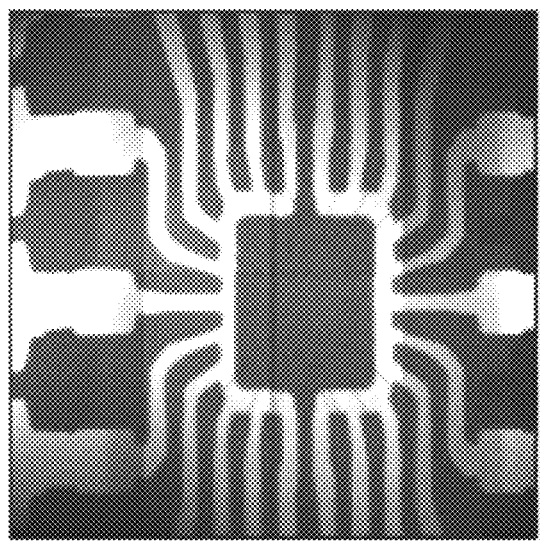
FIG. 4a to FIG. 4c illustrate intermediate and final images using a system according to an embodiment of the present invention for extending the field-of-view of a small sensor according to an embodiment of the present invention. The insert in FIG. 4c represents the image acquired at the position indicated by the white square without application of the current invention.
Figure 4B:
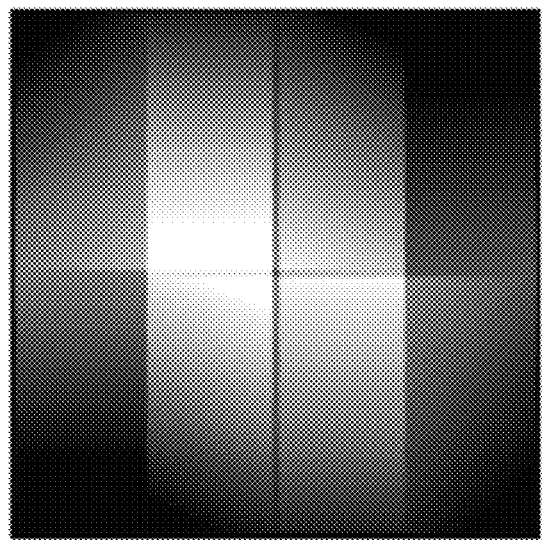
Figure 4C:
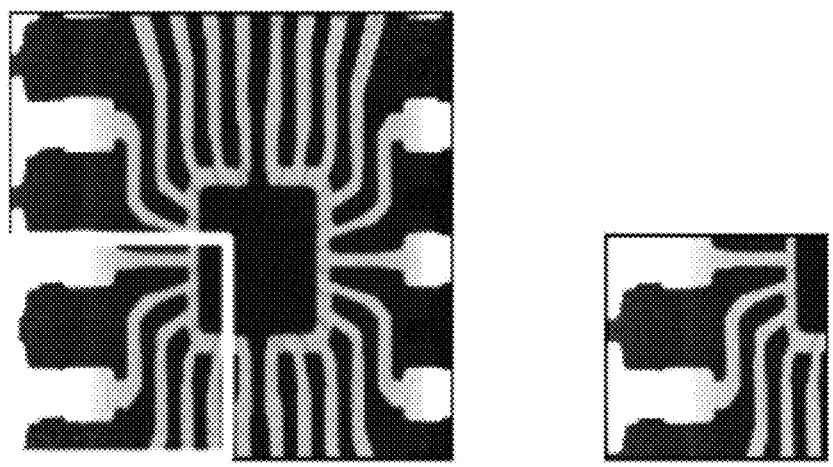

In a third example, the method according to embodiments of the present invention are used for extending the field-of-view of a small sensor. In the example, a 2 cm by 2 cm sensor used by the single-module HEXITEC detector was virtually extended to 4 cm by 4 cm. The conventional way of doing this is by acquiring a small number of discrete images at offset positions, which are then combined in post processing. Using the system as described in the first aspect, this can be automated into a continuous stream of slightly offset frames along a path of interest, removing the need for any post processing or image registration. A 4 cm by 4 cm virtual sampling grid was created by moving the HEXITEC system over a 2 cm by 2 cm S-shaped path. An S-shaped path was chosen here to ensure sufficient overlap and no unlit virtual pixels. The S-shaped path showed a spatial extent of 20 mm, both in x direction and in y direction. The exposure time in this example was 60 s and the effective virtual frame size was 160 by 160 pixels of 250 by 250 micrometre. As in the tiled sensor example, both an integrated but non-uniformly exposed frame and a virtual exposure frame were acquired, as shown in FIG. 4a and FIG. 4b, respectively. By again normalising the raw integrated frame as shown in FIG. 4a using the virtual exposure frame shown in FIG. 4b, the corrected image as shown in FIG. 4c was acquired, providing four times the field of view of the actual sensor in a fully automated way. An image obtained using conventional static acquisition is also shown, demonstrating the increased field-of-view and well-maintained spatial resolving power.

Figure 5:
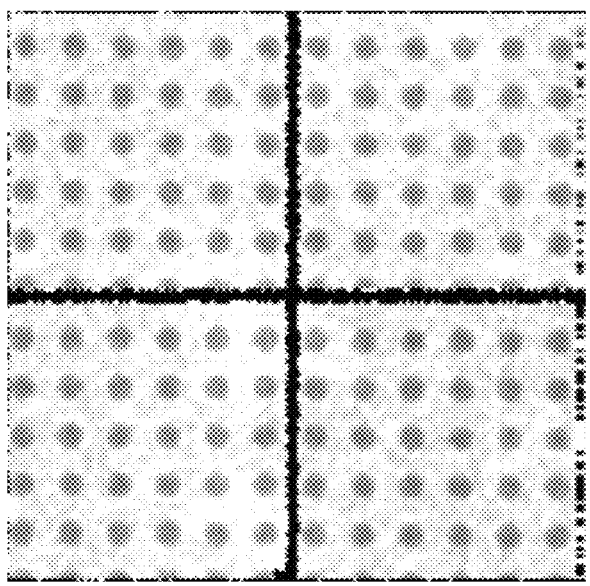
FIG. 5 illustrates a zoomed radiograph of a Medipix2 sensor as can be used in embodiments according to the present invention, showing the bump bonds on a regular 55 µm pitch grid, a very regular structure to assess the gap between the sensors.

In the proposed method, a distinction needs to be made between the different coordinate systems and their relationship. As the proposed methodology is based on the correlation between pixels in both coordinate systems (one physical and one virtual), it is of key importance to have a well-described geometry in the physical system. Although this is obvious in single-sensor detectors, the relative positioning of the different sensors in multi-sensor assemblies may be less accurate. FIG. 5 shows high-resolution a radiographic image of a Medipix2 sensor, showing the bump-bonds on a regular grid with 55 µm in both directions, acquired using the 2×2 HEXITEC ASIC assembly bump bonded to a 1 mm thick CdTe sensor without application of the method according to present invention. This image is an illustration of how the exact size of the inter-tile gap can be determined. As this grid is very regular, a small misalignment of the HEXITEC chips with respect to each other can be identified. It should be noted that with a stationary detector, it is important that the gap equals a multiple of the pixel size in order to map the whole image on a single frame without interpolation. It is important to note that with an improved characterization of these gaps the present invention can handle non-integer multiples of the pixel size, hence can cope with this misalignment.

Figure 6:
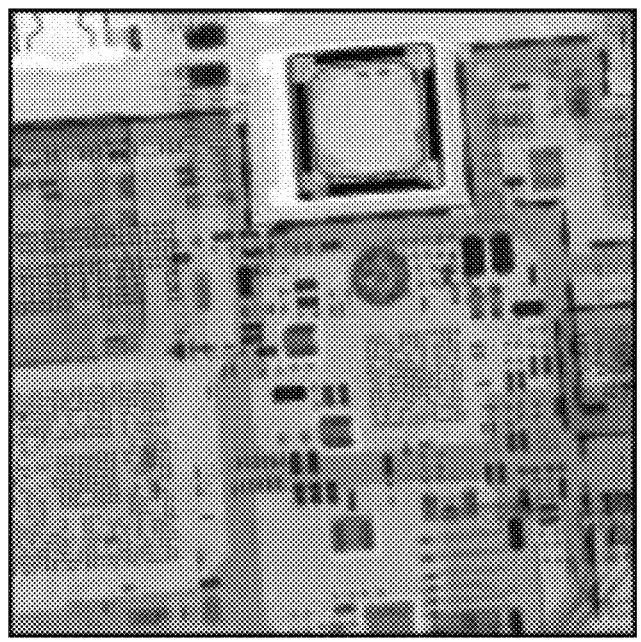
FIG. 6 illustrates a radiograph of a PCB from a smartphone according to an embodiment of the present invention for multi-sensor X-ray detectors, illustrating the strong reduction of inter-tile effects and defective pixels.

Further by way of illustration, FIG. 6 shows a radiographic image of a PCB extracted from a smartphone, acquired using an embodiment of the present invention, using the 2×2 HEXITEC ASIC assembly bump bonded to a 1 mm thick CdTe sensor.

Other radiographic images (FIG. 7, FIG. 8 and FIG. 9) are acquired using a single module HEXITEC detector. For the creation of FIG. 7 an artificial gap of 4 pixels was introduced, both horizontally and vertically. As a result, 4 artificial quadrants of 37×37 pixels were created, also removing one row and column at the sides of the sensor. This module is read out at 9.1 kHz.

Due to the moving detector trajectory and missing pixels, the illumination in the stationary coordinate system is not uniformly distributed. It is however possible to retrieve a virtual exposure frame or exposure map, counting the number of physical frames used to fill each pixel in the virtual grid. An example of such an exposure frame is shown in FIG. 2c, FIG. 3c, FIG. 4b and FIG. 8b. It is obvious that the pixels closer to the edge of the image have a lower number of contributing frames. Additionally, using the relatively simple trajectories used in this study, the horizontal and vertical lines of the inter-sensor gaps can still be observed in the exposure frame as well as in the raw virtual frame. After normalization of the raw virtual frame with the exposure frame, these effects have disappeared almost entirely (see also FIG. 2d).

Discussing now the noise distribution due to irregular elimination and shape of the trajectory, the non-uniform illumination requires a normalization. However, this also results in an uneven noise distribution over the image. It is obvious that this is related to the shape of the trajectory and that it will affect the final image quality in a non-trivial way. The optimal trajectory can in some cases also depend on the shape of the object being imaged, and no general optimization can be made.

The movement of the detector may slightly reduce the spatial resolution of the final images. On one hand, inherently an amount of motion is included in the exposure time of a single frame. However, as this exposure time is very small in comparison with the full acquisition of a virtual frame, the motion is considered negligible. The physical pixel grid and the pixel grid of the virtual frame are not matching, which may induce a minor loss in resolution. To assess the influence of this motion, a single module HEXITEC system was used, in which artificial gaps were introduced by setting two horizontal and two vertical lines to 0. FIG. 7 shows a radiograph of an electronic component on which the sharpness can be evaluated due to the presence of very small bonding wires. In FIG. 7a, the artificial gaps are mitigated using a translational motion, for which the corresponding image corrected for the heterogeneous exposure is shown in FIG. 7b. FIG. 7c shows the equivalent image using a stationary detector without artificial masking. A very minor loss of spatial resolution can be observed, yet this may be due to the specific embodiment and is not considered critical compared with the advantages of the method proposed in present invention.

Although this work focuses on the mitigation of inter-tile gaps in large-area FFADs, the described method has additional advantages. On one hand, defective pixels, which are commonly encountered in high-Z photon counting detectors, can be treated similarly to the inter-tile gaps. On the other hand, the field-of-view (FOV) can be extended. Although the latter is similar to conventional stitching of images, it is noteworthy that the proposed method has very limited overhead in the measurement time as compared with conventional stitching.

FIG. 8a shows a radiographic image of the same electronic component using a single module HEXITEC, for which the FOV was extended to approximate the 2×2 detector assembly. To achieve this, an S-shaped path with a side length of 2 cm was followed. FIG. 8b shows the corresponding illumination image, from which the non-uniformity is clear. Finally, FIG. 8c shows a comparison with a static image of one of the quarters, illustrating the minor loss in spatial resolution and the non-uniformity in noise behaviour.

To assess the noise behaviour and sharpness in this result, a part of the image is compared with the static image using the same detector. FIG. 9a shows a detail of the upper-right corner of FIG. 8c, while FIG. 9b shows the static image of the same region. Note that the total exposure time to achieve FIG. 8 is identical to the exposure time of FIG. 9b. To compensate for the different exposure time per imaged area, FIG. 9c shows the same detail of an image acquired using the proposed method to extend the field-of-view at 4 times the exposure time as compared with the static image in FIG. 9b. Note that due to the motion, a small amount of smoothing is introduced at the bond wires.

The setup for this proof-of-principle demonstrator makes use of a generic XY stage, able to carry the full assembly and driven by stepper motors. The synchronization between the detector frames and the readout of the motor position is not perfect. On one hand, a small delay is present in the motor position readout, which results in an offset in the synchronization error. On the other hand, due to the serial communication an additional uncertainty is introduced. These effects will introduce an inconsistency hence unsharpness in the reconstruction. In this example, the influence of these effects is minimized by applying only low translation speeds as compared with the frame rate. For more performant implementations, the ASIC could be mounted on an XY stage which is integrated in the full readout module. As the total weight to be translated is much lower, a smaller XY stage can be used.

Furthermore, the readout of these stages can be integrated with the ASIC readout, having only minimal latency and a shared timing clock.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

The invention claimed is:

1. An X-ray detection system comprising:
 a solid-state detector module comprising a plurality of detector tiles configured for directly detecting X-ray radiation, each detector tile comprising an array of pixels, said detector module further comprising a plurality of interstitial areas separating adjacent tiles of the detector module, and
 at least one actuator for inducing motion of the detector module to a plurality of detection positions along a trajectory with respect to a stationary reference frame while the detector module is operated in an exposure mode,
 wherein the induced motion of the detector module occurs at least in a direction parallel to the smallest dimension of the largest interstitial area,
 wherein a spatial extent of the trajectory in the stationary reference frame during the exposure mode is at least as large as the smallest dimension of the largest interstitial area, and
 wherein the detector module is programmed for acquiring a plurality of frames in the exposure mode at a frame acquisition rate at least a factor of 100 faster than the inverse of a predetermined exposure time for the exposure mode.

2. The X-ray detection system according to claim 1, wherein the induced trajectory induces a movement of the detector tiles with respect to a stationary source.

3. The X-ray detection system according to claim 1, wherein the system furthermore comprises a repositionable carrier structure configured for receiving and securing the detector module and
 wherein the at least one actuator is configured for inducing motion of the detector module through actuating the repositionable carrier structure.

4. The X-ray detection system according to claim 1, wherein the at least one actuator comprises at least one of a motorized linear actuator, a piezoelectric actuator, a magneto-restrictive actuator.

5. The X-ray detection system according to claim 1, wherein the plurality of detection positions along the trajectory are located in a common plane.

6. The X-ray detection system according to claim 1, further comprising a processing unit programmed for determining the plurality of detection positions along the trajectory based on at least a predetermined total field of view for detection and on a predetermined virtual sampling grid comprising a plurality of sampling points defined in the stationary reference frame, the processing unit being operatively coupled to the at least one actuator to control the induced motion of the detector module by the at least one actuator via a sequence of drive signals generated in accordance to the plurality of detection positions along the trajectory.

7. The X-ray detection system according to claim 6, wherein the processing unit is further programmed for determining an effective exposure time for sampling points of the virtual sampling grid based on the determined trajectory.

8. The X-ray detection system according to claim 6, further comprising position feedback means, such as non-contact optical or magnetic linear encoders or inertial guidance system comprising motion sensors, configured for gathering position feedback information relative to a current detection position of the detector module when driven.

9. The X-ray detection system according to claim 8, wherein the processing unit is operatively coupled to the position feedback means to receive the gathered feedback information, and the processing unit further being adapted for determining the current detection position of the detector module based on the received feedback information.

10. The X-ray detection system according to claim 9, wherein the processing unit is further programmed for adjusting the trajectory based on the determined current detection position of the detector module.

11. The X-ray detection system according to claim 6, wherein the processing unit is operatively coupled to the detector module to receive the plurality of frames acquired in exposure mode, and is also adapted for identifying charge clusters in each of the received acquired frames and for determining a point of origin and a total charge for each identified charge cluster,
 wherein each charge cluster is indicative of a detection event and is extending over a collection of neighboring pixel elements of the detector module.

12. The X-ray detection system according to claim 11, wherein the processing unit is further programmed for assigning a corresponding sampling point of the virtual sampling grid to each point of origin and for combining the plurality of frames into at least one output image having a selectable pixel grid size,
 wherein combining into the at least one output image comprises applying detection event selection rules, such as X-ray photon coincidence removal or X-ray photon energy thresholding, to the individual sampling points before resampling the virtual sampling grid at the selected resolution to generate the at least one output image.

13. A method for reducing an amount of missing or defective output image data in a solid-state X-ray detector module, the detector module comprising a plurality of detector tiles for directly detecting X-ray radiation, each detector tile comprising an array of pixels, said detector module further comprising a plurality of interstitial areas separating adjacent tiles of the detector module, the method comprising:
 based on a predetermined field of view for detection and on a predetermined virtual sampling grid comprising a plurality of sampling points defined in a stationary reference frame, determining a trajectory for the detector module and a plurality of detection positions along the trajectory,
 moving the detector module in the stationary reference frame in accordance with the determined trajectory, wherein a travel range of the determined trajectory in the stationary reference frame is at least as large as the largest interstitial area,
 acquiring, during an exposure time for the detector module and whilst moving along the determined trajectory, a plurality of frames at a frame acquisition rate at least a factor of 100 faster than the inverse of said exposure time, combining the plurality of acquired frames into at least one output image comprising output image data in output image regions associated with the interstitial areas, wherein the movement of the detector module occurs at least in a direction parallel to the smallest dimension of the largest interstitial area.

14. The method according to claim 13, further comprising steps of:

in each frame acquired by the moving detector module, identifying charge clusters, determining a point of origin and a total charge for each identified charge cluster, assigning a sampling point of the virtual sampling grid to each point of origin, applying detection event selection rules, such as X-ray photon coincidence removal or X-ray photon energy thresholding, to the individual sampling points of the virtual sampling grid, and resampling the virtual sampling grid at a selectable resolution to generate the at least one output image.

15. The method according to claim 13, further comprising the steps of:

gathering position feedback information relative to a current detection position of the detector module when moved, determining the current detection position of the detector module based on the gathered position feedback information, adjusting a coordinate in the stationary reference system for sampling points of the virtual sampling grid based on the determined current detection position of the detector module, optionally, adjusting the trajectory or at least a fraction of the plurality of detection positions along the trajectory based on the determined current detection position of the detector module, based on the trajectory or adjusted trajectory, determining an effective exposure time for each sampling point of the virtual sampling grid.

16. The method according to claim 13, wherein the detector module is moved in a plane oriented at 90+/−30 arc degrees with respect to a beam axis of an X-ray beam incident on the detector module and/or wherein the detector module is moved by applying a sequence of drive signals in accordance with the determined trajectory to at least one actuator coupled to the detector module.

17. The method according to claim 13, wherein the induced trajectory induces a movement of the detector tiles with respect to a stationary source.

* * * * *